United States Patent [19]

Son

[11] Patent Number: 4,667,349
[45] Date of Patent: May 26, 1987

[54] WATER SAVING STOPCOCK
[75] Inventor: Lee C. Son, Seoul, Rep. of Korea
[73] Assignee: Sang M. Park, Providence, R.I.
[21] Appl. No.: 870,246
[22] Filed: Jun. 2, 1986
[30] Foreign Application Priority Data
  Jul. 19, 1985 [KR] Rep. of Korea ............................ 9109
[51] Int. Cl.⁴ ............................................... E03C 1/00
[52] U.S. Cl. ......................................... 4/191; 251/113;
  251/353; 137/801; 137/901; 239/428.5
[58] Field of Search ............................ 4/415, 191, 192;
  251/111, 113, 353; 137/901, 801; 239/579, 569,
  428.5; 141/348

[56] References Cited
U.S. PATENT DOCUMENTS
602,598  4/1898  Field ................................... 137/901
1,839,413  1/1932  Sage ..................................... 251/353
2,175,718  10/1939  Litle, Jr. ............................... 137/901
4,181,987  1/1980  Kesselman ............................... 4/191
4,191,332  3/1980  De Langis et al. ............... 239/428.5
4,273,310  6/1981  Ginzler ................................ 137/901

Primary Examiner—Charles E. Phillips
Assistant Examiner—Linda J. Sholl
Attorney, Agent, or Firm—Salter & Michaelson

[57] ABSTRACT

A water saving device that is attached to a conventional water faucet and that includes a vertical movable actuating member for promptly closing off water flow through the device, and further includes a laterally movable member that is pressed inwardly to move a ball valve to the open position for allowing flow of water through the device wherein a preset flow of water through the device may be obtained by a simple touch of the hand.

3 Claims, 4 Drawing Figures

WATER SAVING STOPCOCK

BACKGROUND AND SUMMARY OF THE INVENTION

The water saving device as embodied in the present invention includes an attachment to a conventional water faucet, whereby saving of water is attained by the prompt opening and closing of a water supply control valve located in the device.

In conventional stop cocks, flow of water is normally controlled by turning the valve handle of the water valve several times. It is not only inconvenient to rotate the valve handles of the conventional faucet, but these devices also waste a large amount of water since it is difficult to promptly close off the water flow after obtaining the required flow and temperature of the water.

The present invention, unlike the conventional stop cock, is not only designed to cure the above-mentioned problems, but is very easy to operate, permitting easy opening and closing of the stop cock by a touch of the hand, and thus, water saving is obtained by prompt discontinuance of water flow through the stop cock.

DESCRIPTION OF THE DRAWING

In the drawing which illustrates the best mode presently contemplated for carrying out the present invention.

DESCRIPTION OF THE INVENTION

Figure 1:
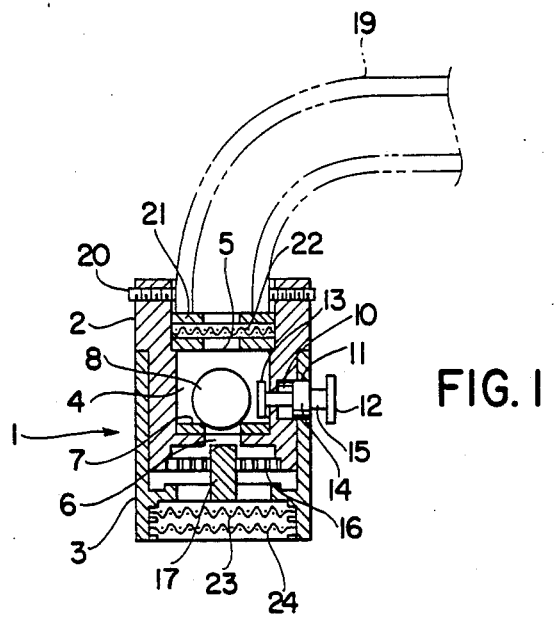
FIG. 1 is a sectional view of the stop cock as embodied in the present invention and illustrates the operating mechanism of the device in the closed position thereof.
Figure 2A:
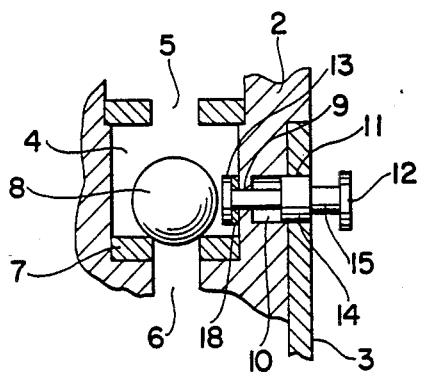
FIG. 2(a) is a partial sectional view showing the operating mechanism of the stop cock in the same position as illustrated in FIG. 1.
Figure 2B:
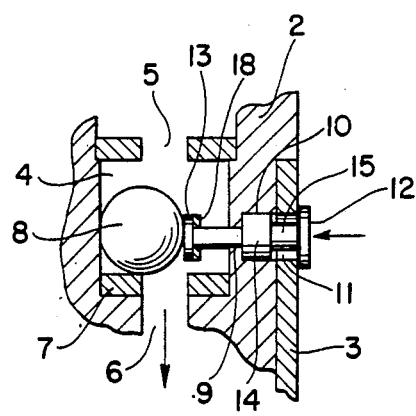
FIG. 2(b) is a view similar to 2(a) but illustrates the location of the ball valve of the stop cock in the open position thereof.
Figure 2C:
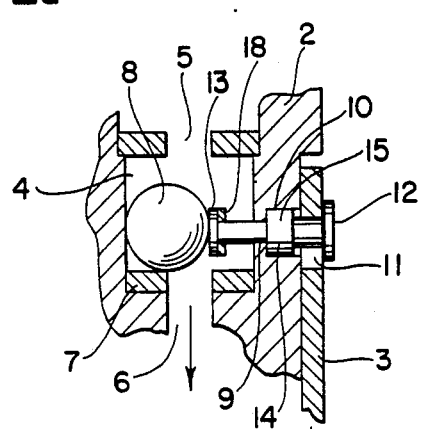
FIG. 2(c) shows the position of the operating elements of the device as located in the open position thereof.

Referring now to FIG. 1, a stop cock body is generally indicated at 1 and includes a separately formed cylindrical member 2 and an outer cylindrical member 3, the inner and outer cylindrical members 2 and 3 being formed in a removable assembly. A valve cavity 4 having an inlet port 5 and an outlet port 6 is located within the inner member 2, and a valve seat 7 is positioned at the bottom of valve cavity 4. A ball valve 8 is located in the valve cavity 4, and, as shown in FIG. 1, is positioned in engagement with the valve seat 7. As shown in FIGS. 2(a), 2(b) and 2(c), a reduced passageway 9 communicates with an enlarged passageway 10 that are formed on one side of a wall of the inner member 2, the reduced passageway 9 communicating with the valve cavity 4. An opening 11 that is formed of the same diameter as the enlarged passageway 10 is located in the outer member 3 and also communicates with the enlarged passageway 10. An actuating member or button 12 located externally of the outer member 3 is interconnected to an inner plate 13 through an enlarged passage part or land 14 and a small passage part or shaft 15, the parts 14 and 15 being received in the enlarged passageway 10 and opening 11 of the inner and outer members 2 and 3, respectively. The inner plate 13 that is interconnected to the button 12 is located so as to make contact with the ball valve 8 within the valve cavity 4.

Referring again to FIG. 1, a porous plate 16 through which water flows is shown installed at the bottom of the inner member 2, and a center projection 17 which provides for uniform discharge of water through the plate 16 is also installed centrally of the outer member 3 and is located in concentric relation with respect to the outlet port 6. As shown in FIGS. 2(a), 2(b) and 2(c), a packing seal 18 is fixed to the inner plate 13 of the button 12 for making sealing contact with the inner wall of the cavity 4 when the stop cock is closed. As again shown in FIG. 1, the inner member 2 is mounted on the outermost end of a faucet pipe 19 and is secured thereto by screws 20. Packing 21 is mounted within the upper end of the inner member 2 adjacent to the nozzle of the faucet 19 and cooperates with a similar packing element to retain a metal filter screen 22 in place. Screens 23 and 24 are fixed in the lower end of the outer member 3 and act as filters for water that is discharged therethrough.

The operation of the stop cock by urging the button 12 inwardly and by lifting the outer member 3 will now be described in detail hereinbelow with reference to FIGS. 2(a), 2(b) and 2(c). As shown in FIG. 2(a), the stop cock is located in the closed position, in which position the ball valve 8 as positioned in the valve cavity 4 rests on the valve seat 7, and water is thereby prevented from flowing through the outlet port 6 due to pressure of the water on the ball valve. Pressure of the water on the inner plate 13 causes the packing 18 to seal the small passageway 9, and in this position the enlarged part 14 that is interconnected to the button 12 is received in the opening 11 of the outer member 3. When the button 12 is pressed inwardly as indicated by the arrow in FIG. 2(b), the inner plate 13 urges the ball valve 8 toward the side of the cavity wall, whereupon the outlet port 6 is opened for receiving flow of water therethrough. Simultaneously, the enlarged passage part 14 of the button 12 is received in the enlarged passageway 10, and the reduced passage part 15 is received in the opening 11 as formed in the wall of the outer member 3. As the water flows through the outlet port 6 of the stop cock, the button 12 is locked in place in the inner position as will now be described, and flow of the water is continuous until the stop cock is returned to the outer or closed position thereof. In obtaining a locking of the button 12 in the inner or open position so as to maintain water flow through the stop cock, it is seen, as illustrated in FIG. 2(c), that the enlarged passage part 14 of the button 12 moves into the enlarged passageway hole 10, and the passage part 15 moves into the hole 11 of the outer member 3. At this point, the outer member 3 falls downwardly by gravity until the upper edge of the hole engages the passage part 15. A portion of the outer member 3 now obstructs the enlarged passageway 10 and prevents the passage part 14 from moving outwardly. The ball valve 8 is then maintained in the open position, and water flow through the device is continuous. When it is required to stop the flow of water through the stop cock, the outer member 3 is lightly pushed upwardly from the bottom to align the hole 11 with the enlarged passageway 10, whereafter pressure of the water in the cavity 4 forces the passage part 14 into the hole 11 of the outer member 3. Thus the button 12 is once again moved to the outer open position and flow of water through the device is interrupted as the water in the cavity moves the ball valve 8 onto the seat 7 to seal the discharge opening 6.

It is seen that unlike the conventional stop cock, the present invention provides for opening and closing of the water supply by simply pushing the button inwardly or by pushing upwardly on the outer member 3. The device is not only easy to operate but also provides for saving of water through the labor saving step as described, wherein the immediate cut off of the water through the device or the prompt flow of water therethrough without the resetting or turning of the hot and cold faucet screw valves is accomplished.

What is claimed:

1. A water saving stop cock for use with a water faucet having a nozzle through which water is discharged, comprising an inner member on which an outer member is mounted for limited vertical movement with respect thereto, said inner member being secured to said nozzle and having an interior cavity formed therein that receives water from said nozzle, a discharge opening formed in said cavity through which water is discharged, a ball valve located in said cavity and normally being located over said discharge opening for preventing discharge of water therethrough, and an actuating member having a portion that extends through said outer member and inner member and terminating in an inner plate that extends into said cavity, said actuating member being laterally movable to cause said inner plate to move said ball valve out of engagement with said discharge opening to allow for flow of water through the stop cock, said outer member moving vertically downwardly by gravity to lock said actuating member in the open position, said outer member being liftable upwardly relative to said inner member to release said actuating member from the locked position thereof which is returned to the closed position by water pressure in said cavity, said ball valve thereafter being moved by the pressure of said water over said discharge opening to close off flow of water therethrough.

2. A water saving stop cock as claimed in claim 1, said outer member including an opening through which said portion of said actuating member extends, said portion including a large part and a small part, said large part being received in said opening in said outer member when said ball valve is located over said discharge opening wherein flow of water through said stop cock is prevented, said small part being movable into said opening in said outer member upon inner lateral movement of said actuating member, wherein said outer member moves downwardly to misalign the opening therein with said large part to prevent the actuating member from retracting and thereby locking said actuating member in the open position thereof.

3. A water saving stop cock as claimed in claim 2, the upward lifting movement of said outer member causing said opening therein to become aligned with said large part, the pressure of water in said cavity causing said large part to retract into said opening in said outer member thereby locking said actuating member in the closed position thereof, whereafter said ball valve is moved over said discharge opening to close off flow of water therethrough.

* * * * *